May 24, 1932.  H. NEUHAUSS  1,859,680
INDUCTION ELECTRIC FURNACE
Filed Sept. 19, 1928
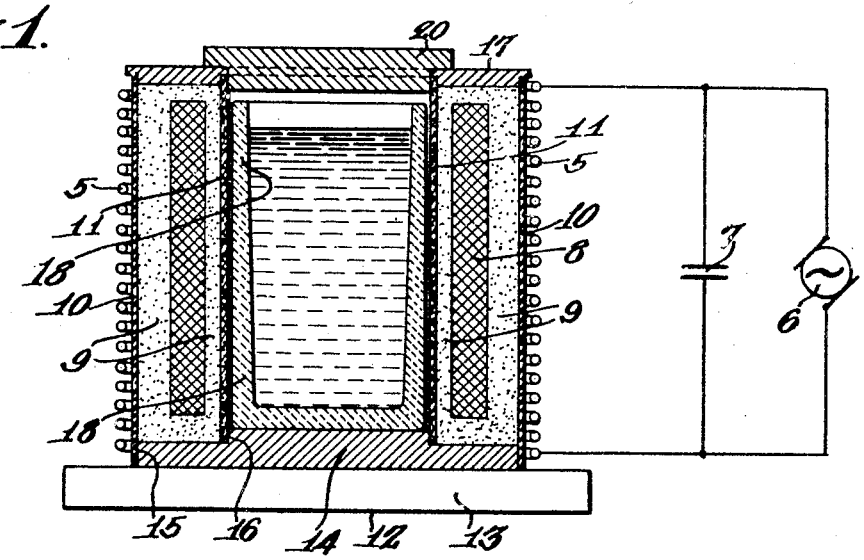
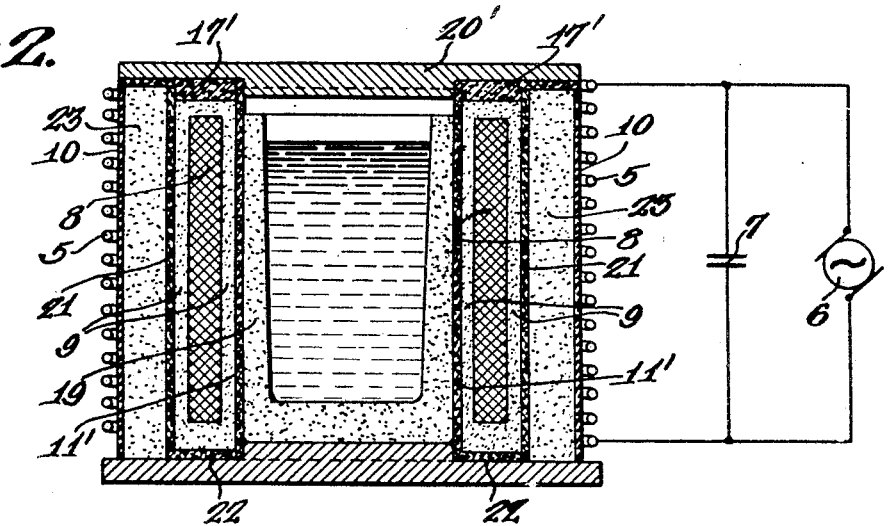
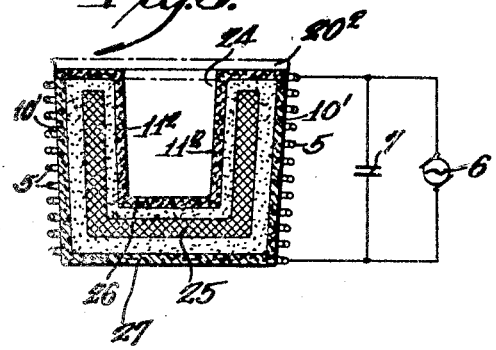
INVENTOR
Heinrich Neuhauss.
BY
ATTORNEY Patented May 24, 1932

1,859,680

UNITED STATES PATENT OFFICE

HEINRICH NEUHAUSS, OF DUSSELDORF, GERMANY, ASSIGNOR TO THE AJAX METAL COMPANY, OF PHILADELPHIA, PENNSYLVANIA, A CORPORATION OF PENNSYLVANIA

INDUCTION ELECTRIC FURNACE

Application filed September 19, 1928. Serial No. 306,820.

My invention relates to induction furnaces intended for heating charges which are not electrically conducting.

The main purpose of my invention is to make a graphite heating element effective at high temperatures by taking up oxygen from about it in a surrounding medium.

A further purpose is to extend the life of a graphite heating element which forms a secondary of a coreless type induction furnace by surrounding it with a medium with which the oxygen comes in contact before it reaches the graphite and which, because of the material or because of the powdered form or for both reasons preferably has great affinity for oxygen, protecting at the same time against free access of outside air.

Further purposes will appear in the specification and in the claims.

The illustrations are intended to be suggestive of preferred embodiments only selected because they well illustrate the principles involved.

Figures 1, 2 and 3 are vertical cross sections of furnaces embodying my invention.

In the drawings similar numerals indicate like parts.

Where a furnace charge is electrically conducting, current can be induced in it directly and the limit of temperature to be reached is dependent upon the capabilities of the refractory retainer and the vaporizing point of the metal. However, when attempt is made to heat materials such as ceramics, which are not electrically conducting, by induction furnaces it is necessary to provide an electrically conducting secondary about the charge and to heat the charge by conduction, convention and radiation from this secondary. Under electric furnace conditions convection currents are inconsiderable and may be ignored. Except where the crucible forms the secondary, conduction heating is less effective than radiation and the heating is effective largely by radiation.

With comparatively low temperatures it is not difficult to find suitable metallic secondaries or to use graphite as a secondary—usually as a crucible—with good effect. However, when the temperatures go above the safe metallic limits graphite also has been unavailable, except at excessive replacement cost, because at these high temperatures its affinity for oxygen is greatly increased, resulting in the burning out of the graphite secondary after an occasional use or a few uses only. The carbon monoxide formed passes off as a gas.

My invention is directed to the protection of the graphite so as greatly to prolong its life and to bring its cost down within commercial requirements.

Referring to the figures, I show an inductor furnace coil 5 to which alternating current is applied as by generator 6. The power factor of the supply is shown as corrected by condensers 7.

Within this inductor I place and maintain a graphite secondary 8 shown in the form of a cylinder. In order to avoid immediate and rapid deterioration of the graphite with use at high temperatures I surround the graphite by powdered carbon 9 which, in the best form known to me, is in the form of carbon black. The carbon may be used in the form of powdered graphite, coke or charcoal, for example, and completely surrounds the graphite cylinder.

The carbon is retained and at the same time the furnace coil is electrically insulated by a cylinder 10 of micanite, for example, and the carbon is held on the inside by a cylinder 11 which must not only be capable of standing the temperatures but which is desirably a good heat conductor. I prefer to make this cylinder of carborundum. So far as this cylinder itself becomes heated it also becomes a radiator of heat; and it makes no difference whether the charge be heated by conductor and radiation of heat from the secondary (graphite cylinder) or from the carborundum which is heated from the secondary.

In any event the heat radiation and conduction through the carborundum will not be lessened except as the temperature of the carborundum is raised, utilizing it as a heating element in closer relation to the charge than is the graphite.

The structure is supported upon a base 12 which for convenience is made up of any suitable bottom plate 13 and inner plate 14.

Whether the bottom plate and inner plate be made in two parts or not, it is convenient to step them, providing shoulders 15 and 16 by which the cylinders 10 and 11 are centered and spaced. The opening between the micanite and carborundum cylinders is closed by an annular cover 17, completing an annular closed space whose walls shut off access of the atmosphere and within which there is trapped, initially a small amount of air.

The initial amount of air is reduced to a minimum by the graphite and by the surrounding filling of finely divided carbon.

The charge is shown in Figure 1 as resting within a crucible 18 and in Figure 2 as resting within a sand lining 19, the character of support of the charge being immaterial.

I show a cover 20 over the entire furnace.

Figure 2 differs from Figure 1 in using a high temperature preferably heat conductive material, illustrated by carborundum, not only for the inner cylinder 11' but for an outer cylinder 21 and top and bottom members 17' and 22. The furnace structure is completed in Figure 2 by a cover 20' and by additional heat insulation 23, such, for example as sand, outside of the carborundum and which lies preferably inside of the inductor coil and its insulation.

In Figures 1 and 2 I have shown the secondary as a cylinder form for the reason that this is the simplest and most convenient form and also the most effective form. I desire to apply the heat element about the charge. However, this does not mean that these side walls may not be the side walls of a vessel having other walls also, whether the other walls merely do not interfere with the proper heating function of the side walls or assist in it. To illustrate this fact I have shown in Figure 3 side graphite walls of generally cylindrical form, tapered slightly to agree with the general taper of the opening 24 for the charge. These graphite side walls are joined by a bottom wall 25 of graphite forming a graphite secondary of container shape whose bottom wall is also a heat-transfer wall heated by conduction of heat from the side walls.

The walls are all surrounded by finely divided carbon held in, outside and inside by retaining carborundum walls of container shape forming outer and inner tapered walls 10' and 11², bottom walls 26 and 27 and cover 20².

I have described my preferred structure in the details indicated because of the requirement of the statute that I disclose the best form known to me and without any intention of being restricted to details of the description and illustration given.

It will be obvious that the frequency used is material in so far only as it may operate to advantage with the use of graphite for the cylinder to secure good furnace results.

Ultimately the protective carbon will be sufficiently consumed to require removal of the ash and replacement of a new supply of finely divided carbon.

Among the various forms of finely divided carbon which may be used it is desirable under certain circumstances to use different forms upon the outside and inside of the graphite secondary. For example, where the heat-conductive quality of this protective material is desirable on the inside powdered graphite can there be used at the same time that carbon black is being used upon the outside of the secondary.

Obviously the value of my invention lies in the thorough protection given to a graphite secondary for a furnace inductor and my invention is, therefore, independent of the shape of the secondary, the relative position, frequency and other electrical characteristics of the primary with which it is associated and the position and character of the charge to which it is applied. Though finding its greatest usefulness with an electrically non-conducting charge it would have utility also with charges which are electrically conducting but of shape, for example, which does not lend itself well to direct generation of secondary current within them.

While I have described my invention throughout in its best form which is the form in which current is induced within the graphite as a secondary by an alternating current primary it is not necessary to the broader features of my invention that the electric current be passed through the graphite inductively from a primary and I have broadened my claims accordingly.

In view of my invention and disclosure variation and modifications to meet individual whim or particular need will doubtless become evident to others skilled in that art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. The method of protecting a graphite inductive heating element from oxidation at high temperature produced by the passage of electric current through it which consists in covering the graphite element on all sides by a finely divided carbonaceous material adapted to take up the oxygen and shutting off access of the atmosphere to the element and covering.

2. The method of protecting a graphite secondary for an electric induction furnace primary from oxidation at high temperatures which consists in completely surrounding the graphite secondary by a finely divided absorbing carbon and protecting against free access of air to the finely divided carbon.

3. In a high temperature inductor furnace free from interlinkage with transformer iron, an inductor coil, a hollow graphite secondary therein, a crucible within the secondary, a covering of powdered carbon about the graphite on all sides and means for holding the powdered carbon in position about the graphite.

4. In a coreless type inductor furnace, an inductor coil, a graphite secondary within the coil and having a wall adapted to surround the furnace charge, retaining walls inside and outside the graphite wall and spaced further from the graphite on the outside than on the inside and finely divided carbon within the retaining walls and protecting the graphite on all sides.

5. In a coreless type inductor furnace, an inductor coil, an alternating current supply therefor, a secondary of graphite inside the coil, walls about the secondary and spaced from it, the inner of the walls being of heat-conductive, high-temperature-resistant material and a filling of finely divided carbon between the walls and surrounding the secondary.

6. In an electric inductor furnace, an inductor coil, walls forming an annular space within the coil closed to the atmosphere and having a carborundum inner wall, a graphite secondary within the annular space and spaced from its walls and a filling of carbon black about the graphite on all sides.

7. In an electric inductor furnace, an inductor coil, walls forming an annular space within the coil closed to the atmosphere and having a carborundum inner wall, a graphite secondary within the annular space and spaced from its walls and a filling of carbon in finely divided form surrounding the graphite on all sides, that inside the graphite being a better conductor of heat than that on the outside.

8. In an electric inductor furnace, an inductor coil, an electrically insulating and heat insulating wall adjoining the inductor coil, and inside of it a heat conductive high-temperature-resistant, inner wall spaced from the first wall, top and bottom closing walls for the annular space thus formed, finely divided carbon within the annular space thus formed and a graphite cylinder enclosed in the carbon and protected from oxidation by it and by the walls.

9. In an electric inductor furnace, an inductor coil, carborundum walls forming a closed annular space within the inductor coil, finely divided carbon within the annular space, a graphite secondary covered by the carbon and heat insulation outside of the outer wall of the annular space.

HEINRICH NEUHAUSS.